United States Patent [19]

Yamauchi et al.

[11] 4,228,963

[45] Oct. 21, 1980

[54] RECEPTACLE FOR MOTOR-DRIVEN FOOD PROCESSOR

[75] Inventors: Terukazu Yamauchi, Mino; Katsufumi Nishio, Toyonaka; Fusao Niino, Suita; Toyoaki Murasawa, Nishinomiya, all of Japan

[73] Assignee: Matsushita Electric Industrial Co., Ltd., Osaka, Japan

[21] Appl. No.: 33,410

[22] Filed: Apr. 26, 1979

[51] Int. Cl.³ .......................................... B02C 18/22
[52] U.S. Cl. ...................................... 241/92; 83/444; 83/446; 193/44; 241/282.1
[58] Field of Search .................. 241/92, 199.12, 282.1, 241/282.2; 193/7, 44; 83/444, 446

[56] References Cited

U.S. PATENT DOCUMENTS

| | | | |
|---|---|---|---|
| 3,085,607 | 4/1963 | Schottle | 241/92 |
| 3,892,365 | 7/1975 | Verdun | 241/282.1 X |
| 4,095,751 | 6/1978 | Artin | 241/92 |
| 4,113,188 | 9/1978 | Belinkoff | 241/282.1 X |

FOREIGN PATENT DOCUMENTS 40-24699  8/1965  Japan.
40-28225  9/1965  Japan.

Primary Examiner—Howard N. Goldberg
Attorney, Agent, or Firm—Wenderoth, Lind & Ponack

[57] ABSTRACT

For use in a food processor comprising a power unit having a drive shaft, a removable receptacle including a container and a lid having a feed chute communicable to the interior of the receptacle when mounted on the container, and a rotary treating element rotatable within the receptacle together with the drive shaft, a tilt preventing element for preventing a food material inserted into the feed chute from being tilted sideways which comprises an elastic retainer member including a plurality of long elastic tines and a corresponding number of short elastic tines. The long and short tines are curved so that, when the elastic retainer member is removably mounted on the open end of the feed chute opposite to the container, they extend downwardly in the feed chute and diverge outwardly from the surrounding wall defining the feed chute.

11 Claims, 23 Drawing Figures

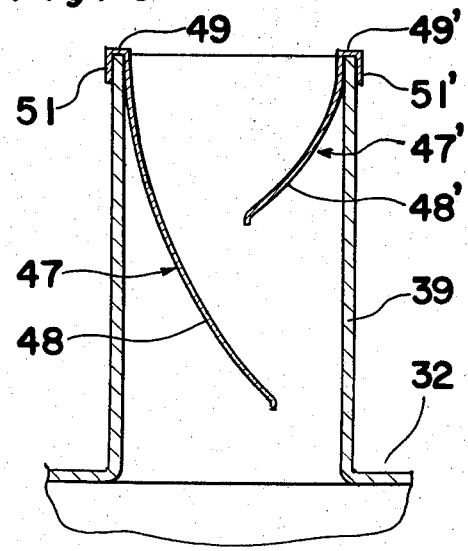
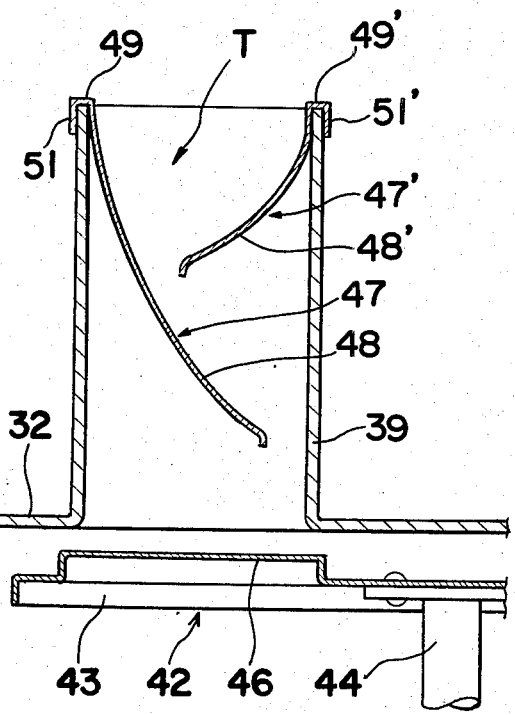
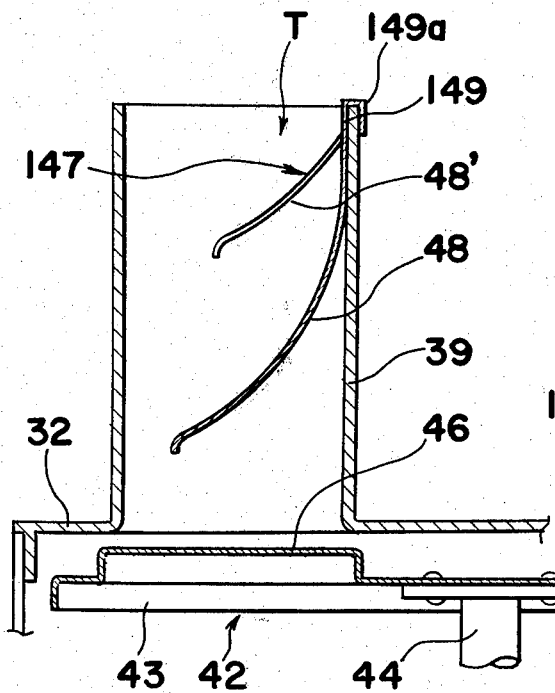
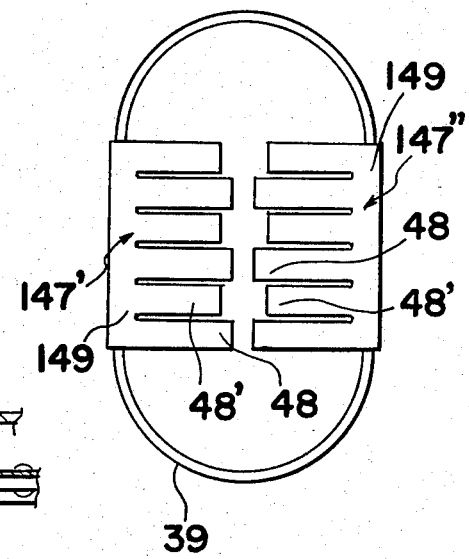

RECEPTACLE FOR MOTOR-DRIVEN FOOD PROCESSOR

BACKGROUND OF THE INVENTION

The present invention generally relates to a motor-driven food processor for household use for processing, or more specifically, chopping, mixing, blending, shredding, slicing, grinding or grating, food material by using different types of removable rotary treating elements and, more particularly, to an improvement in a removable receptacle which is employed in combination with the food processor.

The food processor to which the present invention is directed is of a well known and currently commercially available type. Except for food processors of the type which are capable of only peeling vegetables like potatoes and are like the one disclosed in U.S. Pat. No. 3,848,524, the food processor for processing, for example, chopping, mixing, blending, shredding, slicing, grinding, grating or peeling food material, and to which the present invention is directed, is generally comprised of a power unit including an electric motor and a drive shaft, a receptacle including a container and a lid, and a rotary treating element rotatable within the receptacle by the drive shaft at a high speed, all of which are separable and removable from each other.

For particular uses, there are many types of rotary treating element currently available such as, for example, cutting disc, shredding disc, slicing disc, grating disc, mixing blade and peeling disc. A particular type of rotary treating element is not always limited in its use and, for example, the cutting disc may be used not only for chopping or grinding food material, but also for grating, shredding or slicing and the mixing blade may be used not only for mixing, but also for smashing or blending.

The present invention is specifically directed to an improvement in the removable receptacle which is used in combination with the food processor and, more particularly, to a food holder which is adapted to be removably mounted on a feed chute, which is formed on the lid of the receptacle, for preventing the food material being processed from undesirably tilting sideways in the feed chute.

The Japanese Utility Model Publication No. 40-24699, published on Aug. 21, 1965, discloses the food processor wherein the feed chute includes means for preventing the food material being processed from undesirably tilting sideways in the feed chute. The tilt preventing means disclosed therein comprised of a pair of substantially rectangular elastic retainers each having a plurality of elongated elastic tines which are connected together at one end, by means of a transversely extending strip, and have a substantially comb-like shape. The tines of each of the elastic retainers are bent so that, when the retainers are installed inside the feed chute with the respective strips secured to or embedded in a wall so that they define the feed chute by being in spaced opposed relation, the bent areas of the tines of one elastic retainer protrude outwards towards the bent areas of the tines of the other elastic retainer with the passage in the feed chute consequently being adjustably constricted.

In this arrangement which is disclosed in the Utility Model Publication No. 40-24699, the tilt preventing means, that is, the elastic retainers, is not removable relative to the feed chute.

An improved version wherein the tilt preventing means comprises only the elastic retainer which is similar in construction to that described above, but which has a clip element formed in the strip for joining the tines together so that the elastic retainer can removably be mounted on an inlet open end of the feed chute with the tines protruding into the inside of the feed chute, is disclosed in the Japanese Utility Model Publication No. 40-28225, published on Sept. 28, 1965. Except for the provision of the clip element, the retainer disclosed in the second described publication differs from that disclosed in the first described publication in that the tines are curved like a bow in contrast to the bent areas of the tines of the first described publication.

None of these publications specifically describe a requirement about the lengths of the elastic tines, but the drawings attached thereto suggest that they are of equal length and equally bent or curved in the same direction.

The tilt preventing means disclosed in any one of the above mentioned publications appear to be satisfactory, but it is ineffective to holding the food material relatively firmly in position within the feed chute and as such is required to be improved.

SUMMARY OF THE INVENTION

Accordingly, the present invention has as an object to provide an improved removable tilt preventing means for use in a food processor of the type discussed above, which is effective to hold the food material firmly in position within the feed chute.

Another important object of the present invention is to provide an improved removable tilt preventing means of the type referred to above, which supports the food material being processed at two different levels which are spaced from the plane of rotation of the rotary treating element.

A further object of the present invention is to provide an improved removable tilt preventing means, which is easy to handle and can readily be manufactured without requiring increased manufacturing cost and a complicated manufacturing procedure.

According to the present invention, the tilt preventing means comprises an elastic retainer member including a plurality of long elastic tines which are separated from each other and a corresponding number of short elastic tines which are also separated from each other. These long and short tines are curved so that, when the elastic retainer member is mounted on the open end of the feed chute opposite to the container, they extend downwardly in the feed chute and diverge outwardly from the surrounding wall which defines the feed chute. Because of the difference in length between the long and short tines, the food material inserted in the feed chute can be supported at two different levels which are spaced from the plane of rotation of the rotary treating element thereby assuredly avoiding the possibility of tilting.

More specifically, because of the difference in length between the long and short tines, the free ends of the long tines contact a portion of the food material in the chute adjacent the rotary treating element while the free ends of the short tines contact another portion of the food material remote from the rotary treating element. Therefore, as compared with the prior art tilt preventing means which supports the food material in the feed chute at one level spaced from the plane of rotation of the rotary treating element, the present invention is such that the food material in the feed chute can be supported at two levels and, consequently, can be retained in position within the feed chute.

BRIEF DESCRIPTION OF THE DRAWINGS

These and other objects and features of the present invention will become apparent from the following description taken in conjunction with preferred embodiments thereof with reference to the accompanying drawings, in which:

FIGS. 9 to 11 are views similar to FIG. 5, showing fourth, fifth and sixth preferred embodiments of the present invention;

FIG. 12 is a top plan view of the feed chute having the tilt preventing means, according to a seventh preferred embodiment of the present invention, mounted thereon;

DETAILED DESCRIPTION OF THE INVENTION

Figure 1:
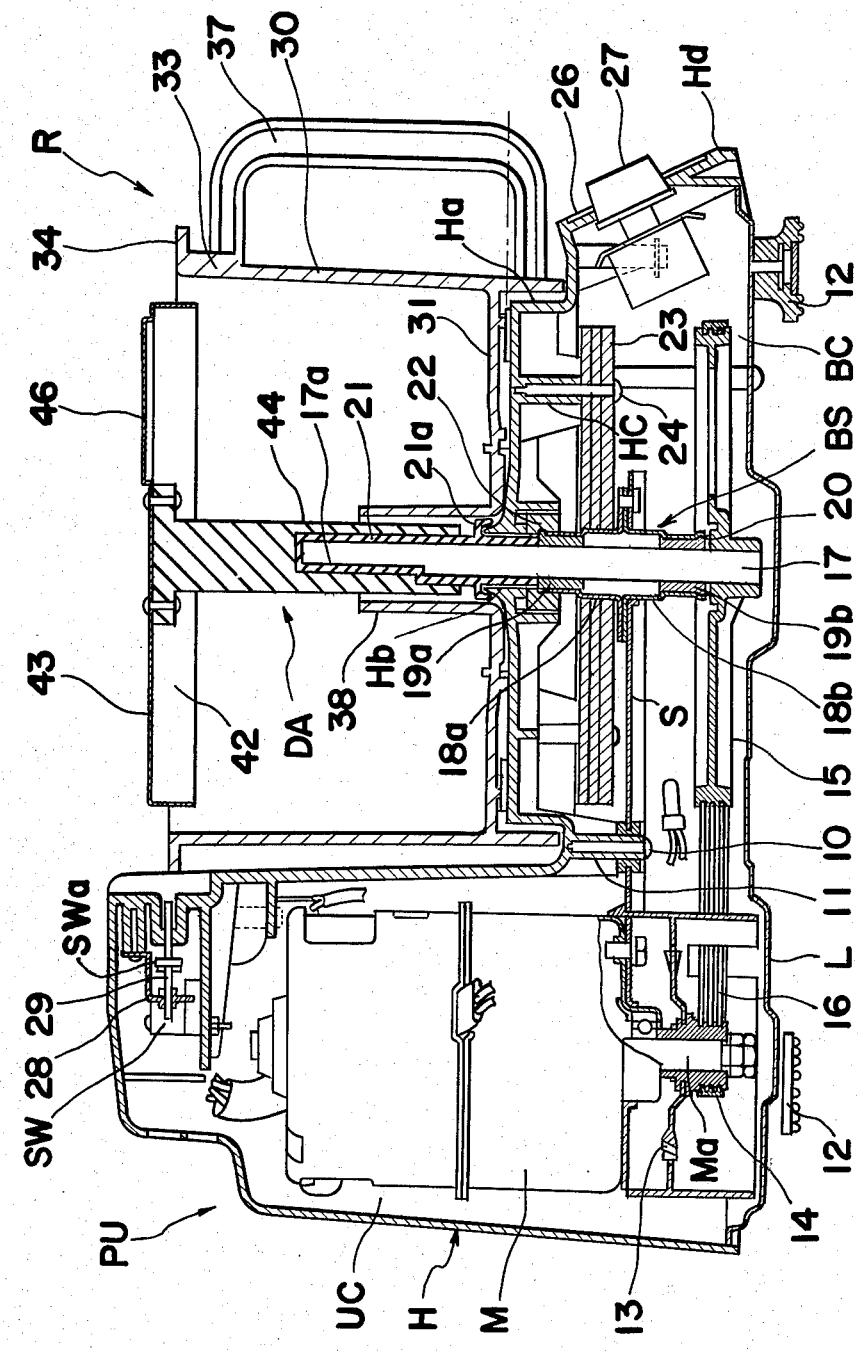
FIG. 1 is a side sectional view of a food processor having only the lid removed.

Before continuing with the description of the present invention it is to be noted that like parts are designated by like reference numerals throughout the accompanying drawings.

Referring first to FIG. 1, a food processor comprises a power unit, a rotary treating element and a receptacle which are generally identified by PU, DA and R respectively.

The power unit PU comprises a substantially L-shaped molded housing H, which is made of synthetic material, and has a base compartment BC and an upright compartment UC, both defined therein. A drive motor M, having a drive shaft Ma, is rigidly mounted on a chassis S which is secured to the housing in any suitable manner, for example, by the use of a plurality of set screws which are threaded into respective support pillars which are molded together with the housing H, only a set of one of the set screws with one of the support pillars being shown respectively by 10 and 11. The chassis S which is positioned within the housing H has one end portion positioned within the base compartment BC and the opposite end portion positioned within the upright compartment UC, the opposite end portion of said chassis S carrying the drive motor M thereon with the drive shaft Ma loosely extending therethrough and terminating at a position which is spaced inwardly from a base lid L. The base lid L may be made of a metallic plate and is used to close the opening at the bottom of the housing H, said base lid L having a plurality of spacer legs 12, for example, four, which can be made of an elastic synthetic material, and are located on the exterior surface of said base lid L.

The drive shaft Ma of the drive motor M has a fan 13 and a drive pulley 14 which are rigidly mounted thereon for rotation together therewith, said fan 13 being used to cause the ambient air to flow towards the drive motor M to cool the latter during the rotation of the motor M. The drive pulley 14 is operatively coupled to a driven pulley 15 by means of an endless belt 16 to drive said driven pulley 15 in one direction, said driven pulley 15 being positioned within the base compartment BC and rigidly mounted on a main shaft 17 for rotation together therewith. The main shaft 17 extends vertically through a bearing structure, generally identified by BS and rigidly carried by the chassis S in a manner as will be described later, and terminates outside the housing H by extending loosely through a raised top wall Ha of the housing H immediately above the base compartment BC.

The bearing structure BS comprises upper and lower joined sleeves 18a and 18b flanged together and rigidly mounted on the chassis S, and upper and lower perforated bearing members 19a and 19b which are pressure-fitted into the respective upper and lower sleeves 18a and 18b, it being understood that the bearing structure BS is designed so as to support the main shaft 17 rotatably, but not axially movable. Positioned between the driven pulley 15 and the perforated bearing member 19b is an assembly 20 having at least one washer and at least one thrust bearing preferably made of an elastic material so that a relative axial movement of the main shaft 17 can be absorbed.

A free end portion of the main shaft 17 which is situated outside of the base compartment BC has a spline groove 17a which is operable in a manner as will be described later. For protecting the main shaft 17 from, for example, any possible corrosion from contact with a corrosive material which may occur if the main shaft 17 is made of a ferrous metallic material such as shown, a portion of the main shaft 17 which is between the upper bearing member 19a and its end extremity remote from the driven pulley 15 is tightly sheathed with a protective covering 21 having a construction as will subsequently be described.

The protective covering 21 is in the form of a sheath having one end closed and held in contact with the top of the main shaft 17, a substantially intermediate portion of said protective covering 21 is integrally formed with an annular cap 21a overhanging an annular projection Hb which is integrally formed with the raised top wall Ha and is in coaxial relation to an opening in the top wall Ha. The annular projection Hb has an inner diameter which is equal to or substantially equal to the outer diameter of the main shaft 17 plus the thickness of the surrounding wall portion of the protective covering 21 such that no liquid medium can leak from the outside of the housing H into the base compartment BC thus preventing the leak which would occur if a gap were present between the main shaft 17 and the annular projection Hb. Positioned on the main shaft 17 and surrounding the boundary between the protective covering 21 and the upper bearing member 19a is an annular cushioning member 22 which is employed for absorbing vibrations and echos caused by the movement of the various movable parts within the housing H.

For enabling the food processor to be steadily placed on, for example, a table through the support legs 12, a balance weight 23 which is comprised of one or more metal sheets or any other suitable heavy material is secured to the undersurface of the top wall Ha by means of a plurality of set screws 24 which extend through the balance weight 23 and are threaded to respective spacer legs Hc which are integral with and extend downwardly from the undersurface of the top wall Ha.

The housing H has a switch panel 26 having push-button switches 27 for selective graduated speed control, and the switch panel 26 is defined at a lateral wall Hd of the housing H laterally located with respect to the base compartment BC and opposite the upright compartment UC.

Within the upright compartment UC and above the drive motor M, there is provided a safety switch SW. This safety switch SW is stationarily supported by the wall forming the upright compartment UC by means of a fixture plate 28 and has an actuator SWa coupled to a push rod 29. The push rod 29 is axially slidably supported by the wall forming the upright compartment UC for movement between retracted and projected positions in a direction towards and at right angles to the longitudinal axis of the main shaft 17 and is normally biased to the projected position by a biasing spring (not shown), it being to be understood that the safety switch SW is switched off when the push-rod 29 is held in the projected position as biased by the biasing spring. It is to be noted that, unless the safety switch SW is switched on in a manner as will be described later, switching on of any one of the switches 27 on the switch panel 26 will not allow the supply of an electric power from a commercial power source to the drive motor M. In other words, only when the safety switch SW is turned on, can any one of the push-button switches 27 be effective to drive the drive motor M when turned on.

The food processor as described above, particularly, the power unit having a drive shaft represented by the main shaft 17, is well known to those skilled in the art and, therefore, the details thereof are herein omitted.

Figure 4:
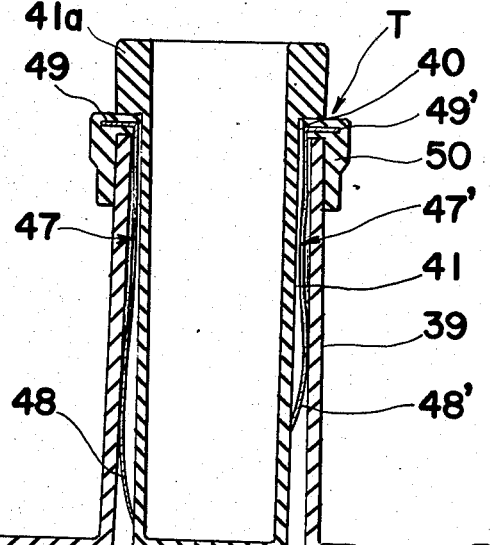
FIG. 4 is a side sectional view, on an enlarged scale, of a receptacle having a feed chute to which a tilt preventing means according to a first preferred embodiment of the present invention is attached, with a plunger inserted in the feed chute.

Referring to FIGS. 1 and 4, the receptacle R comprises a removable container 30 having a bottom wall 31 at one end thereof and a lid 32. The container 30 may be made of either a transparent or semi-transparent synthetic material or an opaque synthetic material and the lid 32 may be made of either a transparent synthetic material or an opaque material. Around the upper edge 33 of the container 30 outwardly extending protrusions are provided to serve as bayonet fastener lugs 34 to rotationally hold the lid 32 thereon in cooperation with bayonet members 35 which are integrally formed with the led 32 at the peripheral edge of the lid 32. As best shown in FIG. 4, one of the bayonet members 35 has a substantially triangular cam projection 36 adapted for engaging the push rod 29 to move the latter from the projected position towards the retracted position against the biasing spring thereby to turn the safety switch SW on when the lid 32 is mounted on the container 30, which has been mounted on the power unit PU in a manner as will be described later, and with the bayonet members 35 fastened to the bayonet lugs 34.

The container 30 has a handle 37 which enables a user of the food processor to carry one or both of the container 30 and the lid 32. The container 30 also has an elongated annular wall 38 protruding up from the bottom wall 31 and inwardly of the container 30 in coaxial relation to an opening defined in the bottom wall 31, the function of said annular wall 38 being described later.

As best shown in FIG. 4, the lid 32 has an upright feed chute 39 which generally extends from a portion of the lid 32 which is adjacent to its perimeter at right angles to the lid 32 in a direction opposite to the container 30. This feed chute 39 has one end communicable with the container 30, when mounted on the container 30, and the other end adapted to receive a food material to be processed and, therefore, serving as a feed inlet 40. Preferably, the upright feed chute 39 has a feed passage having a substantially oval shape and having a long axis extending generally parallel to the direction of rotation of the rotary treating element DA.

Removably inserted in the feed chute 39 is a plunger 41 having a length greater than the length of the feed passage in the feed chute 39 and having one end enlarged at 41a to provide a head portion which, when the plunger 41 is completely inserted in the feed chute 39 with the other end thereof which is spaced slightly from the plane of rotation of the rotary treating element DA as shown in FIG. 4, resting on the free end of the feed chute 39. For this purpose, the enlarged head portion 41a of the plunger 41 has a cross sectional area larger than the surface area of the feed inlet 40. It is to be noted that the plunger 41 may be either hollow, such as shown, or a solid.

Figure 3B:
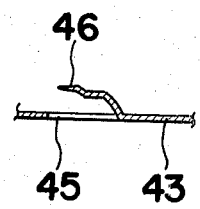
FIG. 3(b) is a view similar to FIG. 2(b), showing the details of a cutting blade located in the cutting disc shown in FIG. 3(a)
Figure 3A:
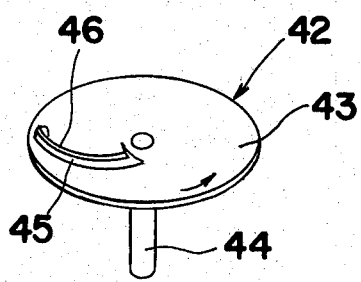
FIG. 3(a) is a view similar to FIG. 2(a), showing a rotary cutting disc which may be used in the food processor shown in FIG. 1.

The rotary treating element DA so far shown in FIGS. 1 and 4 is shown as a cutting disc assembly 42, the details of which are shown in FIGS. 3(a) and 3(b). Referring now to FIGS. 3(a) and 3(b), the cutting disc assembly 42 comprises a disc 43 which is rigidly mounted on a sleeve 44 and are in coaxial relation to each other, said sleeve 44 being adapted to receive the drive shaft, that is, the main shaft 17 for rotation together therewith as shown in FIG. 1. The disc 43 has a slit 45 defined therein which may be either curved such as shown or straight in a radial direction of the disc 43. One side edge of the slit 45 which is located on the trailing side with respect to the direction of rotation of the disc assembly 42 shown by the arrow in FIG. 3(a) is upwardly raised to provide a cutting blade 46. as best shown in FIG. 3(b)

Figure 2A:
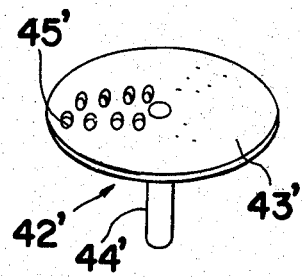
FIG. 2(a) is a schematic perspective view showing a rotary grating disc which may be used in the food processor shown in FIG. 1.
Figure 2B:
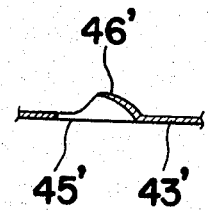
FIG. 2(b) is a cross sectional view showing the details of one of the grating openings located in the grating disc shown in FIG. 2(a)

Shown in FIGS. 2(a) and 2(b) is another type of rotary treating element which is shown in the form of a grating disc assembly 42' comprising a disc 43' rigidly mounted on a sleeve 44' and being in coaxial relation to each other, said sleeve 44' being adapted to receive the drive shaft 17 for rotation together therewith in a manner similar to that shown in FIG. 1. The disc 43' has a plurality of openings 45' defined therein. An edge portion of each of the openings 45' on the trailing side with respect to the direction of rotation of the disc assembly 42' shown by the arrow in FIG. 2(a) is upwardly raised to provide a blade edge 46' as best shown in FIG. 2(b).

These disc assemblies 42 and 42' are examples selected from the various types of rotary treating elements now commercially available and are shown merely for the purpose of illustration.

In the construction so far described, where food material such as, for example, a cucumber, is desired to be cut into round slices, the container 30 is first mounted on the raised top wall Ha of the housing H in coaxial relation to the drive shaft 17 to allow the latter to project into the interior of the container 30. Thereafter and prior to the lid 32 being mounted on and fastened to the container 30 by means of the bayonet fastener, the rotary treating element DA, that is, the rotary cutting disc assembly 42 is placed in position with the sleeve 44 mounted on the drive shaft 17 for rotation together with said shaft 17.

It is to be noted that, when the container 30 is mounted on the raised top wall Ha in the manner as hereinabove described, the annular cap 21a on the protective covering 21 of drive shaft 17 is rotatably held in liquid tight contact with one end of the annular wall 38 adjacent the opening in the bottom wall 31 of the container 30.

The lid 32 is then mounted on and fastened to the container 30. When the lid 32 is fastened to the container 30 by means of the bayonet fastener by rotating the lid 32 through a certain angle about the longitudinal axis of the shaft 17, the push rod 29 is moved from the projected position towards the retracted position in contact with the cam projection 36 and, therefore, the safety switch SW is turned on. By so doing, the food processor is ready to operate.

After or subsequent to insertion of the cucumber into the feed chute 39, one of the push-button switches 27 on the switch panel 26 is depressed. After depressing the switch 27 when the switch SW is turned on by as has hereinabove been described, the drive motor M is driven and the rotational force of said drive motor M is transmitted through the endless belt 15 to the main shaft 17 whereby the rotary cutting disc assembly 42 is rotated at a high speed together with the main shaft 17.

As the cucumber in the feed chute 39 is pushed by the aid of the plunger 41 in a direction towards the cutting disc 43 which is then being rotated about the shaft 17, the cucumber is cut into round slices. Should the cucumber being pushed in the manner described above tilt sideway within the feed chute 39, the resultant round slices of the cucumber will vary in thickness so that, in order to avoid this possibility, means for preventing the cucumber from tilting sideway within the feed chute is utilized, said tilt preventing means being generally identified by T and being described in detail hereinafter.

Figure 5:
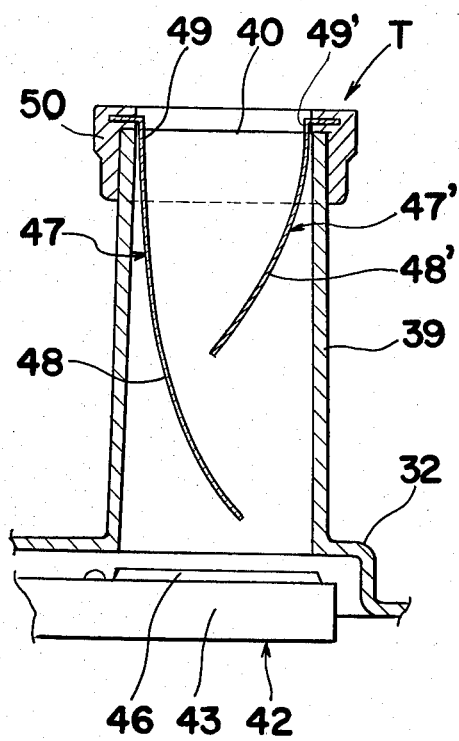
FIG. 5 is a side sectional view of the feed chute shown in FIG. 4, with the plunger removed.

Referring now to FIGS. 4 and 5, the tilt preventing means T according to the first preferred embodiment of the present invention comprises first and second elastic retainers 47 and 47' having a generally rectangular shape and being made of a metallic or synthetic material having a predetermined elasticity. Each of the first and second elastic retainers 47 and 47' has a plurality of tines 48 or 48' which connected at one end in spaced relation to each other to a connecting strip 49 or 49' which extends transversely of the longitudinal direction of each of the tines 48 or 48'. The tines 48 of the first elastic retainer 47 are longer in length than the tines 48' of the second elastic retainer 47'.

These elastic retainers 47 and 47' are retained in position in spaced opposed relation to each other by means of a holder 50 with the respective connecting strips 49 and 49' rigidly connected to, or otherwise non-removably embedded in, the holder 50, said holder 50 having an opening similar to the opening at the feed inlet 40 of the feed chute 39. The long and short tines 48 and 48' of the respective first and second elastic retainers 47 and 47' are curved and are designed so that, when the tilt preventing means T is mounted on the feed chute 39 with the holder 50 resting on the open end of the feed chute 39 at the feed inlet 40 as best shown in FIG. 5, they extend downwardly towards the cutting disc 43 while diverging outwardly from the surrounding wall which defines the feed chute 39.

In operation, as the cucumber, which has a cross section smaller than the cross sectional area of the feed passage in the feed chute 39, is cut into round slices to a length smaller than the length of the feed chute 39, the user of the food processor can no longer hold the cucumber at a position outside of the feed chute 39. Although there may be no problem with tilting as long as the cucumber is held by the user, the problem associated with the tilting sideways of the cucumber in the feed chute 39 can arise during continued slicing of the shortened cucumber by the aid of the plunger 41 which is applying an externally created pushing force to the shortened cucumber. However, in the present invention, since the shortened cucumber is supported at two different levels of height spaced from the plane of rotation of the cutting blade 46 of the rotary cutting disc 43 with the tips of the short and long tines 48' and 48 contacting different portions of the cucumber in the feed chute 39, such a problem can be substantially obviated, that is, the possibility of undesirable tilt of the cucumber in the feed chute 39 can advantageously be minimized.

Figure 6:
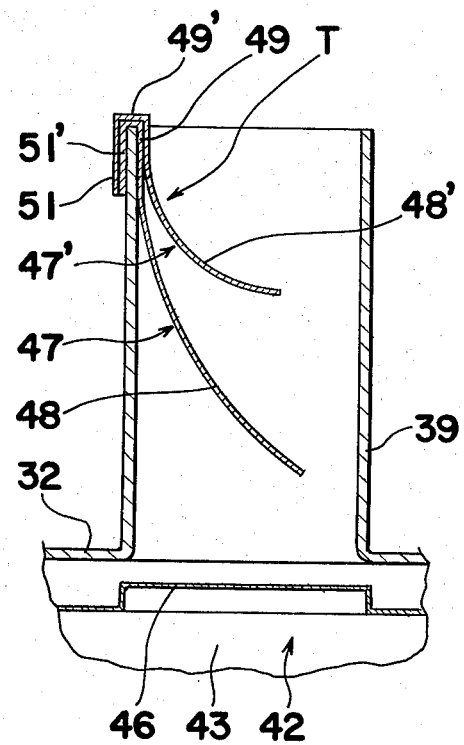
FIGS. 6 and 7 are views similar to FIG. 5, showing second and third preferred embodiments of the present invention.

Although the first and second elastic retainers 47 and 47' have been described as being secured to the holder 50 in spaced opposed relation to each other in the embodiment shown in FIGS. 4 and 5, the second embodiment of the present invention shown in FIG. 6 is such that, while the holder 50 such as shown in FIGS. 4 and 5 is not utilized, the first and second elastic retainers 47 and 47' are utilized in overlapped relation to each other as mounted on the open end of the feed chute 39 with the long and short tines 48 and 48' extending downwardly into the feed chute 39. For this purpose, one side edge portion of each of the connecting strips 49 and 49' of the respective elastic retainers 47 and 47' is bent to assume a substantially inverted U-shape to provide a corresponding elastic clip 51 or 51' through which the elastic retainer 47 or 47' is removably clipped on the open end of the feed chute 39 in a manner as shown in FIG. 6. It is to be noted that, when being used, the second elastic retainer 47' which has the short tines 48' is to be positined above the first elastic retainer 47 which has the long tines 48.

Figure 7:
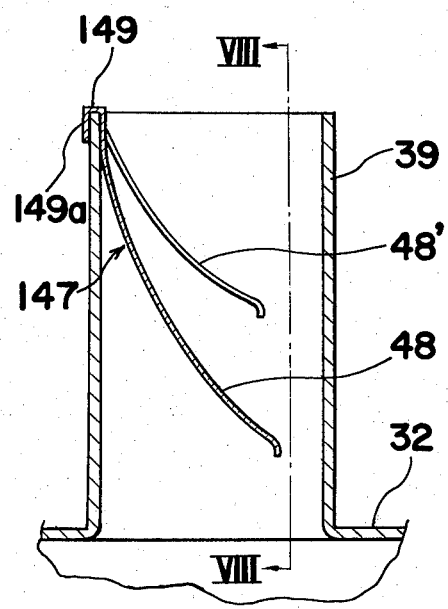
Figure 8:
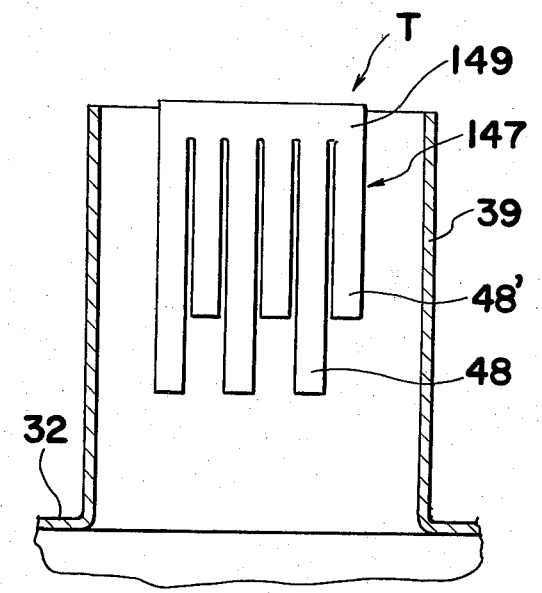
FIG. 8 is a cross sectional view taken along the line VIII—VIII of FIG. 7.

In the third embodiment which is shown in FIGS. 7 and 8, the tilt preventing means T shown therein comprises a single elastic retainer 147 of generally rectangular shape made of a metallic or synthetic material having a sufficient elasticity. This single elastic retainer 147 has a plurality of long tines 48 and an equal number of short tines 48', both of said long and short tines 48 and 48' being so connected together in spaced relation to each other to a common connecting strip 149 that, as best shown in FIG. 8, the long and short tines 48 and 48' are alternately positioned with respect to each other. The connecting strip 149 has one side edge portion, which is opposite to the long and short tines 48 and 48' bent so as to have a substantially inverted U-shape to provide an elastic clip 149a through which the elastic retainer 147 can be removably clipped on the open end of the feed chute 39.

In the embodiment shown in FIG. 9, the first and second elastic retainers 47 and 47' which have been described as being clipped on the open end of the feed chute 39 in overlapped relation to each other in the embodiment shown in FIG. 6, are clipped on the open end of the feed chute 39 in opposed relation to each other without utilizing the holder such as the one which is employed in the embodiment shown in FIGS. 4 and 5.

In the embodiment shown in FIG. 10, the first elastic retainer 47 is mounted on the open end of the feed chute 39 at a position which is radially outward with respect to the lid 32 while the second retainer 47' is mounted on the open end of the feed chute 39 at a position radially inward with respect to the lid 32. The manner of mounting the tilt preventing means T shown in FIG. 10 is advantageous in that, since the cucumber being sliced tends to be pulled in a direction radially outward with respect to the cutting disc 43 with an upper portion of the cucumber tending to tilt in the direction radially inward with respect to the cutting disc 43, this possibility can be substantially eliminated. In other words, since the tips of the long tines 48 apply biasing forces to a lower portion of the cucumber in the feed chute 39 in a direction radially inward with respect to the cutting disc 43 while the tips of the short tines 48' apply biasing forces to an upper portion of the same cucumber in a direction radially outward with respect to the cutting disc 43, the tendency of the lower portion of the cucumber in the feed chute to be radially outwardly displaced in contact with the cutting disc 43 being rotated can advantageously be eliminated. This is particularly true where the cutting blade 46 is located on the trailing side with respect to the direction of rotation of the cutting disc 43 such as shown in FIGS. 3(a) and 3(b).

In the embodiment shown in FIG. 11, the elastic retainer 147 of the construction which has been described with reference to FIGS. 7 and 8 is removably mounted on the open end of the feed chute 39 at a position which is radially inward with respect to the lid 32. The purpose of this arrangement shown in FIG. 11 is substantially similar to that of the arrangement shown in FIG. 10 and is advantageous in that the cucumber in the feed chute 39 is forced to contact a radially outward wall portion of the feed chute 39 without being tilted.

Figure 13:
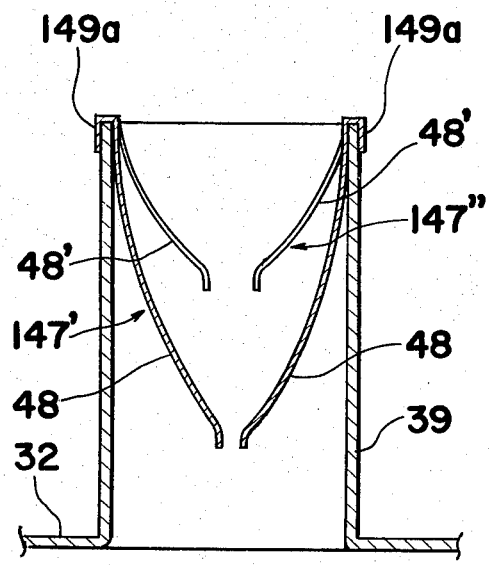
FIG. 13 is a view similar to FIG. 5, showing the tilt preventing means shown in FIG. 12.

Referring now to FIGS. 12 and 13, the tilt preventing means T comprises first and second elastic retainers 147' and 147" each being of the same construction as shown in FIGS. 7 and 8. These first and second elastic retainers 147' and 147" are mounted on, or more specifically, clipped onto the open end of the feed chute 39 in opposed relation to each other. According to the embodiment shown in FIGS. 12 and 13, the cucumber can be held in position within the feed chute 39 without contacting any one of the opposed portions of the wall which define the feed chute 39.

Figure 14:
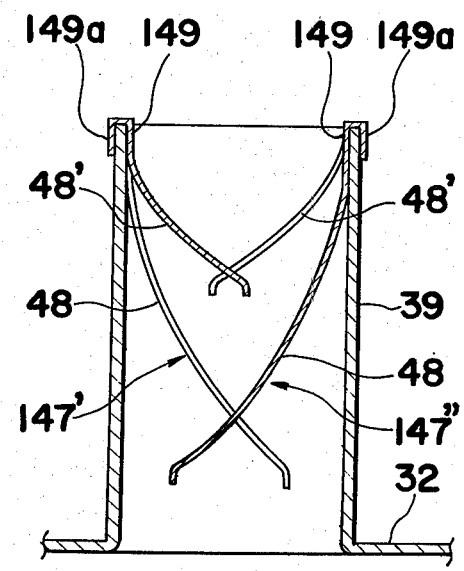
FIG. 14 is a view similar to FIG. 5, showing the tilt preventing means according to an eighth preferred embodiment of the present invention.
Figure 15:
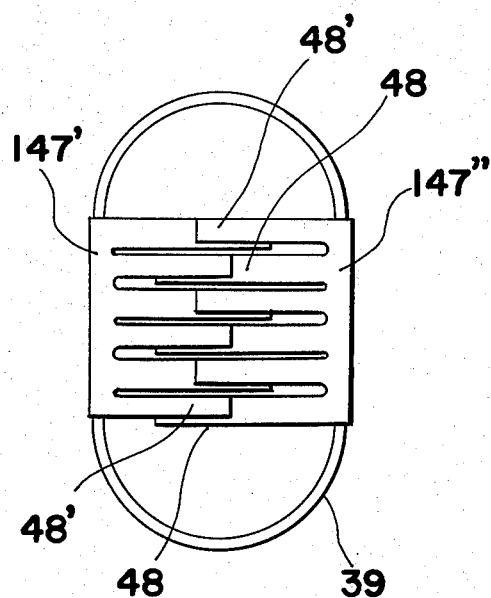
FIG. 15 is a top plan view of FIG. 14.

The embodiment shown in FIGS. 14 and 15 is similar to that shown in FIGS. 12 and 13 except for the difference that the long and short tines 48 and 48' of any one of the first and second elastic retainers 147' and 147" shown in FIGS. 14 and 15 has respective lengths larger than that shown in FIGS. 12 and 13. Therefore, in use, the first and second elastic retainers 147' and 147" are mounted on the open end of the feed chute 39 in a manner such that the long tines 48 of any one of the first and second elastic retainers 147' and 147" extend underneath the short tines 48' of the first and second elastic retainers 147' and 147" as best shown in FIG. 5. The arrangement shown in FIGS. 14 and 15 is advantageous in that, not only can the cucumber be supported at the two different levels, but also the possibility of leaning of the cucumber in a direction generally parallel to the direction of rotation of the cutting disc 43 can be avoided.

Figure 16:
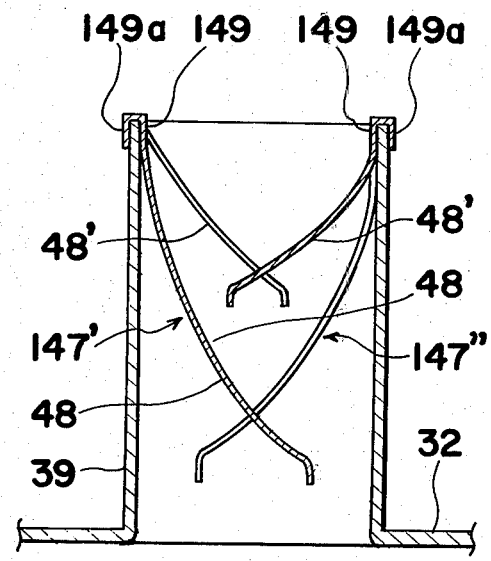
FIG. 16 is a view similar to FIG. 5, showing the ninth preferred embodiment of the present invention.
Figure 17:
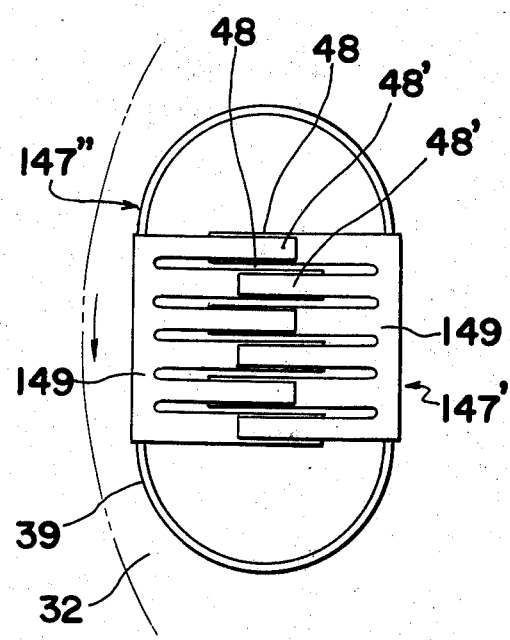
FIG. 17 is a top plan view of FIG. 16.

The embodiment shown in FIGS. 16 and 17 is similar to that shown in FIGS. 14 and 15, but is different therefrom in the manner of mounting the first and second elastic retainers 147' and 147" relative to the direction of rotation of the cutting disc 43. In the arrangement shown in FIGS. 16 and 17, the first and second elastic retainers 147' and 147" are mounted on the open end of the feed chute 39 in opposed relation to each other at respective positions radially inwardly and outwardly of the lid 32 so that the outermost one of the long tines 48 of the first elastic retainer 147' and the outermost one of the long tines 48 of the second elastic retainer 147" can be respectively located on the trailing and leading sides with respect to the direction of rotation of the cutting disc 43 as shown by the arrow in FIG. 17. Since the cucumber inserted in the feed chute 39 tends to tilt with its lower portion dragged by the rotating cutting disc 43 and its upper portion displaced in a direction opposite to the direction in which the lower portion is dragged in contact with the cutting disc 43, the arrangement shown in FIGS. 16 and 17 substantially eliminates this tendency.

Figure 18:
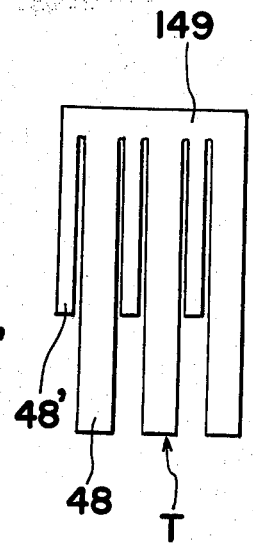
FIG. 18 is a front elevational view of the tilt preventing means according to a tenth preferred embodiment of the present invention.
Figure 19:
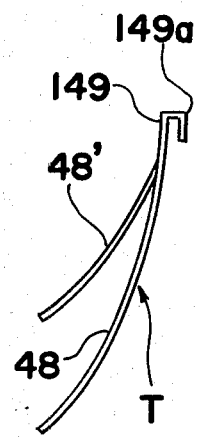
FIG. 19 is a side elevational view of FIG. 18.

The tilt preventing means T according to the present invention can be manufactured by the use of any known press work from a sheet of metal having a sufficient elasticity or by the use of any known plastic molding technique. Even though the raw material for the tilt preventing means has a uniform elasticity, the elasticity of any one of the short tines is greater than that of any one of the long tines when the elastic retainer has been manufactured. Therefore, it may be undesirable to employ the elastic retainer or retainers wherein the long and short tines vary in elasticity. In order to avoid this, it is preferable to render any one of the short tines 48' to have a width smaller than that of the long tines 48 such as shown in FIGS. 18 and 19.

Figure 20:
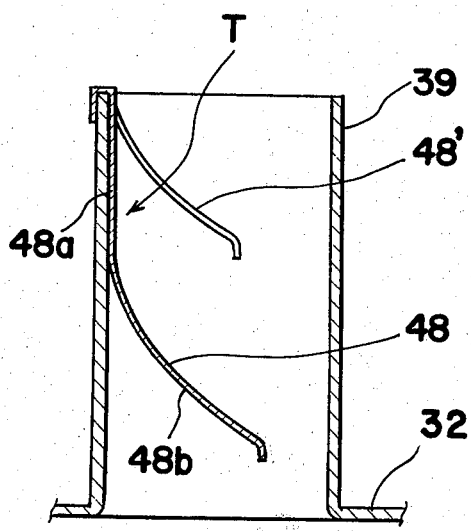
FIG. 20 is a view similar to FIG. 5, showing the tilt preventing means according to an eleventh preferred embodiment of the present invention.

In the embodiment shown in FIG. 20, each of the long tines 48 has a straight portion 48a and a curved portion 48b, the straight portion 48a being such that, when the tilt preventing means T is positioned in place on the open end of the feed chute 39 as shown, it can be held flat against the wall defining the feed chute 39. This is advantageous in that any possible loosening of the elasticity of the long tines 48, which would occur when the long tines 48 are repeatedly pushed backwards in opposition to their elastic bias by contact with the plunger 41, is substantially eliminated.

Figure 21:
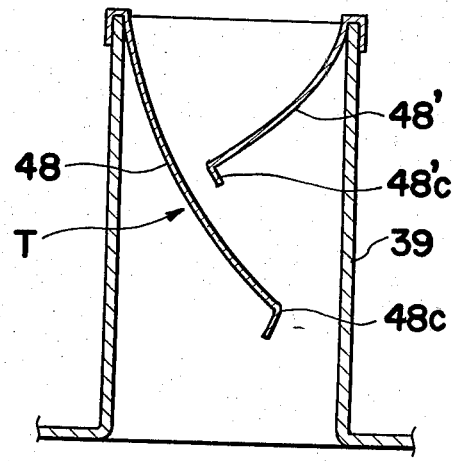
FIG. 21 is a view similar to FIG. 5, showing the twelfth preferred embodiment of the present invention.

In addition, in any one of the foregoing embodiments of the present invention, the tip of any one of the long and short tines 48 and 48' is preferably bent at 48c or 48'c inwardly to avoid the possibility that the cucumber once inserted into the feed chute 39 can not be removed because the tips of the long and short tines 48 and 48' pierce the cucumber, such as shown in FIG. 21.

Although the present invention has been fully described in connection with the various preferred embodiments thereof with reference to the accompanying drawings, it is to be noted that numerous changes and modifications may be apparent to those skilled in the art. Such changes and modifications are to be understood as included within the true scope of the present invention unless they depart therefrom.

We claim:

1. A tilt preventing means for use in a food processor of the type which has an electric motor with a drive shaft, a removable receptacle which includes a container and a lid with the lid having an upwardly extending wall which defines a feed chute which connects the exterior at one open end of the chute with the interior of the receptacle at a second end when it is mounted on the container, and a rotary treating element which is caused to rotate at a high speed within the receptacle by the drive shaft, said tilt preventing means comprising:
an elastic retaining means having a plurality of long elastic tines which are spaced laterally from each other and a corresponding plurality of short elastic tines which are spaced laterally from each other, said elastic retaining means being removably mounted at said one open end of said feed chute so that said long and short tines extend downwardly into said feed chute, said long and short tines being curved so that said long and short tines extend inwardly away from said chute wall defining said chute.

2. A tilt preventing means as claimed in claim 1, wherein said elastic retaining means comprises first and second elastic retainers, said first elastic retainer having said long tines and said second elastic retainer having said short tines.

3. A tilt preventing means as claimed in claim 2, wherein said first elastic retainer has a shape for being mounted on said one open end of said feed chute at a position radially outward with respect to said rotary treating element.

4. A tilt preventing means as claimed in claim 2, wherein each of said short tines has a width smaller than the width of said long tines.

5. A tilt preventing means as claimed in claim 1, wherein said elastic retaining means comprises a single elastic retainer having both said long and short tines, said long and short tines being alternately positioned with respect to each other.

6. A tilt preventing means as claimed in claim 5, wherein said elastic retainer has a shape for being mounted on said one open end of said feed chute at a position radially inward with respect to said rotary treating element.

7. A tilt prevent means as claimed in claim 1, wherein said elastic retaining means comprises first and second elastic retainers 8. A tilt preventing means as claimed in claim 7, wherein one of said first and second elastic retainers is removably mounted on said one open end of said feed chute at a position radially inward with respect to said rotary treating element with said long tines thereof extending into said chute and the other of said first and second elastic retainers positioned so as to have said long tines thereof positioned on the trailing side, with respect to the direction of rotation of said rotary treating element, of said long tines of said one of said first and second elastic retainers. each having said long and short tines alternately positioned with respect to each other, said first and second elastic retainers having a shape for being mounted on said one open end of said feed chute in spaced opposed relation to each other.

9. A tilt preventing means as claimed in claim 1, wherein each of said long tines comprises a straight portion and a curved portion, said straight portion contacting said wall which defines said feed chute when said tilt preventing means is placed in position on said open end of said feed chute.

10. A tilt preventing means as claimed in claim 1, wherein the free end of each of said long and short tines is inwardly bent such that, when said tilt preventing means is placed in position on said one open end of said feed chute, each of said long and short tines extends so as to generally diverge from said wall which defines said feed chute with the ends of said tines being bent inwardly away from said wall.

11. A tilt preventing means as claimed in claim 1, wherein said elastic retaining means further comprises a holder having an opening similar to the opening of said feed chute, said holder shaped for being mounted on said open end of the feed chute for retaining said long and short tines.

* * * * *